United States Patent
Huschke et al.

(10) Patent No.: US 8,321,739 B2
(45) Date of Patent: Nov. 27, 2012

(54) BEAM-FORMING

(75) Inventors: Jörg Huschke, Aachen (DE); Michael Meyer, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 594 days.

(21) Appl. No.: 12/523,789

(22) PCT Filed: Jan. 10, 2008

(86) PCT No.: PCT/EP2008/050245
§ 371 (c)(1),
(2), (4) Date: Nov. 13, 2009

(87) PCT Pub. No.: WO2008/084079
PCT Pub. Date: Jul. 17, 2008

(65) Prior Publication Data
US 2010/0064193 A1    Mar. 11, 2010

(30) Foreign Application Priority Data

Jan. 10, 2007   (WO) ................. PCT/EP2007/000170

(51) Int. Cl.
*G08L 25/02* (2006.01)
*H04L 1/18* (2006.01)

(52) U.S. Cl. ........................................ 714/748; 370/334

(58) Field of Classification Search .................. 714/748; 370/334
See application file for complete search history.

(56) References Cited

U.S. PATENT DOCUMENTS

2003/0012195 A1   1/2003   Ohkubo et al.
2008/0002627 A1*  1/2008   Cha et al. .................. 370/334

FOREIGN PATENT DOCUMENTS

JP    H07-087011 A    3/1995

OTHER PUBLICATIONS

Yan Sun: "Transmit diversity techniques over wireless networks" Wireless Communications and Networking conference. 2004 vol. 1. Mar. 21, 2004, pp. 593-598 XP010707940.

* cited by examiner

*Primary Examiner* — Sam Rizk

(57) ABSTRACT

A method for optimizing re-transmission in a multi-antenna multi-terminal network, the method comprising the following steps performed by a station of the network: receiving from at least one terminal of multiple terminals one or more messages indicating a failed transmission of data sent to the multiple terminals; determining from the received one or more messages if a switching-to-beam-forming criterion is matched and, if the criterion is matched, initiating a re-transmission of the data to the at least one terminal via a beam-forming technique involving one or more of the multiple antennas and using at least one beam for the re-transmission of the data.

20 Claims, 9 Drawing Sheets

BEAM-FORMING

TECHNICAL FIELD

This invention relates to improvements in or relating to beam-forming for re-transmissions, particularly, but not exclusively, associated with circumstances where feedback is received from terminals receiving an original multicast transmission.

BACKGROUND

Beam-forming is a well-known technique that gives rise to a virtual antenna pattern of a particular shape, by using a number of individual antenna elements that form part of the overall antenna. The antenna pattern is typically shaped to give rise to a "beam" directed towards a particular user. This maximizes the antenna gain in this particular direction. In addition, the pattern of the beam can be shaped to guarantee minimum gain in the direction of unintended users, which has the additional benefit of reducing interference in the network. A beam-forming unit calculates the phase and amplitude offsets by which the antenna elements should be driven, to give rise to a particular shape of antenna pattern. This is achieved by adjustment of the azimuth, and possibly the elevation angles, to the intended and unintended uses and may be augmented by feedback from the mobile station. In general, the greater the number of antenna elements the more accurate and precise the beam pattern formed.

A multicast transmission can be broadcast to a user group or groups in a particular cell that consists of a limited number of users that can employ feedback from the terminal to adapt the multicast transmission. The feedback can be in the form of a request to re-transmit transport blocks, such as for example an automatic repeat request (ARQ) non-acknowledgement message (NACK) (also referred to as an ARQ-NACK). This may be used in, for example, a GSM (Global system for mobile communication), UMTS (Universal Mobile Telecom System) or LTE (long term evolution) multicast-broadcast multi-service (MBMS) environment. In a multicast transmission environment with ARQ, including hybrid ARQ (HARQ), any user which has not received the transport block correctly can transmit an NACK message so that the base station will re-transmit the missing transport blocks. This may take place with different modulation and coding schemes. The re-transmission may then be combined in the receiver with previous transmissions in order to enable successful decoding of the transport block. This process may be repeated until a predefined criterion is achieved. For example, until all terminals in the group have correctly received the transport blocks; or until a predetermined maximum number of re-transmissions have been reached.

Beam-forming is usually applied to transmissions intended for a single user. In the case of a multicast for multiple users, all should be able to receive the same transmission simultaneously. If the multicast is broadcast to users which are randomly distributed within a particular cell, it is generally not possible to produce an antenna pattern shaped in such a way that all users receive a transmission of sufficiently high gain. This is due to the fact that the antenna pattern includes notches in certain directions between some of the users. In general the number of users that can be addressed with a unique antenna pattern tends to be equal to the number of elements in the antenna array. As a result, for groups of more than a few users, beam-forming is not applied to multicast transmissions.

US 2003/00 647-5481 (Wilson et al) discloses a system and related method for clustering multi-point communication targets. This patent application discloses building a set of clusters including one or more targets, and sharing a wireless communication channel with the clusters based at least in part on performance characteristics of the targets, such as the spatial signature. The target may be allocated or reallocated to one or more clusters as appropriate and performance characteristics of the targets are monitored in order to reinitiate the relative weight of a target within a cluster. This patent application does not teach how to address the issue of a target not receiving a transmission and the subsequent solution to that problem.

SUMMARY

It is therefore an object of the present invention to improve transmission in a multi-antenna multi-terminal network.

This object is solved by the independent claims. Advantageous embodiments are described in the further claims.

According to a first aspect of the invention, a method for optimizing re-transmission in a multi-antenna multi-terminal network is provided. A station of the network performs the step of receiving from at least one terminal of multiple terminals, one or more messages indicating a failed transmission of data sent to the multiple terminals. The station further performs the step of determining from the received one or more messages if a switching-to-beam-forming criterion is matched. If the criterion is matched, the station performs the step of initiating a re-transmission of the data to the at least one terminal via a beam-forming technique involving one or more of the multiple antennas and using at least one beam for the re-transmission of the data.

According to a second aspect of the invention, a station for optimizing re-transmission in a multi-antenna multi-terminal network is provided. The station is adapted to receive from at least one terminal of multiple terminals, one or more messages indicating a failed transmission of data sent to the multiple terminals. The station is further adapted to determine from the received one or more messages if a switching-to-beam-forming criterion is matched, and if the criterion is matched, the station is adapted to initiate a re-transmission of the data to the at least one terminal via a beam-forming technique involving one or more of the multiple antennas and using at least one beam for the re-transmission of the data.

According to a third aspect of the invention, a system for optimizing re-transmission in a multi-antenna multi-terminal network is provided. The system comprises one or more stations as described before and multiple terminals. Data can be sent from the one or more stations to the multiple terminals and in the case of a failed transmission of such data at least one of the multiple terminals may be adapted to send to the one or more stations one or more messages indicating a failed transmission of the data sent to the multiple terminals. At least one of the one or more stations is further adapted to determine from the received one or more messages if a switching-to-beam-forming criterion is matched. If the criterion is matched, said at least one station is adapted to initiate a re-transmission of the data to the at least one terminal via a beam-forming technique involving one or more of the multiple antennas and using at least one beam for the re-transmission of the data.

According to a fourth aspect of the invention, a computer program loadable into a processing unit of a station is provided. The computer program comprises code adapted to receive from at least one terminal of multiple terminals, one or more messages indicating a failed transmission of data sent to the multiple terminals, to determine from the received one or more messages if a switching-to-beam-forming criterion is matched, and if the criterion is matched, to initiate a re-transmission of the data to the at least one terminal via a beam-forming technique involving one or more of the multiple antennas and using at least one beam for the re-transmission of the data.

The present invention improves the transmission in a multi-antenna multi-terminal network especially in situations of failed transmissions. Terminals that have not received an initial transmission can now be more effectively served with a re-transmission using beam-forming technique. In particular, when the number of terminals that have not correctly received the initial transmission drops below a given threshold (as an example for a switching-to-beam-forming criterion), the station can use beam-forming for re-transmission to these terminals. This significantly reduces the number of times the data of the initial (failed) transmission have to be transmitted and saves power in operating the base station and the terminals. Hence, a more efficient use of—e.g. multicast—transmission can be achieved because of a better utilization or even reduction of beam-forming elements such as antennas. Spectral efficiency and coverage can be increased without requiring additional installation of antennas or increases in the power requirements of the overall systems.

BRIEF DESCRIPTION OF THE DRAWINGS

Reference will now be made, by way of example, to the accompanying drawings, in which.

DETAILED DESCRIPTION

Figure 1:
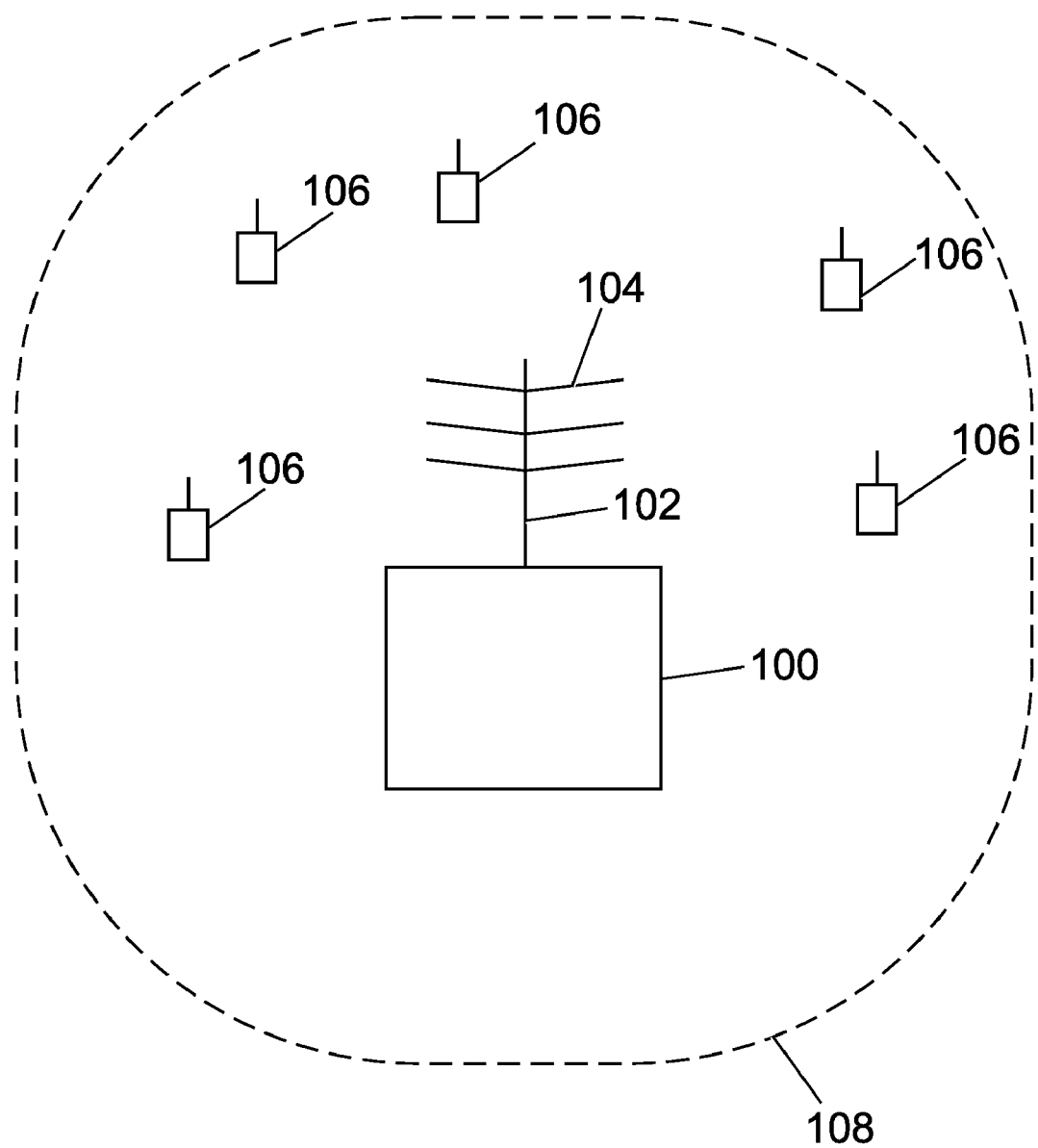
FIG. 1 is a block diagram of an overall system in accordance with one embodiment of the invention, given by way of example.

Referring initially to FIG. 1, a base station 100 is shown. The base station includes an antenna system 102 which has N antennas 104, which communicate with a plurality of terminals 106 within a cell area, shown generally by dotted line 108.

The antenna system 102 can be used to transmit and re-transmit a message to the terminals 106 by means of a multicast, broadcast or other type of transmission. The manner in which the transmission occurs depends on the circumstances and will be described in more detail below. A message comprises data or information which can be segmented into one or more data blocks. In accordance with the present invention a first transmission is made to the terminals 106 by means of the antenna system 102. One or more of the terminals may not receive all the messages that formed the transmission and may communicate this to the base station by means of a non acknowledgement transmission (NACK) which is received and processed at the base station. This is achieved by allocating each terminal with dedicated resources to produce such a transmission. A NACK may be generated as a result of a failed transmission where some data of the message is received and some of the message fails to be received. Failure of receipt of the complete transmission also constitutes a failed reception of the message or transport blocks.

Upon receipt of the non acknowledgement transmission at the base station the base station may re-transmit the message or part thereof to those terminals which did not receive it the first time. The manner in which the transmission (or re-transmission) of the message from the base station takes place will depend on a number of circumstances, for example the nature of the antenna at the base station. In addition, in the case of either transmission or re-transmission, the base station may decide the nature of the technique used to transmit or re-transmit the message. The detail of how the decision may be made will be described in greater detail below and constitutes an important feature of the present invention.

Figure 5:
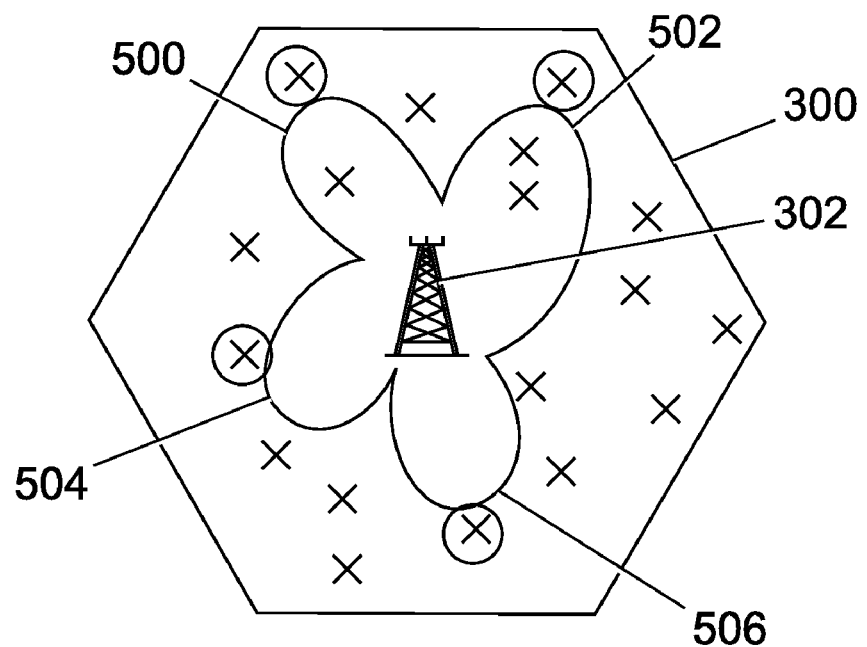
FIG. 5 is a diagram demonstrating terminals in a cell relative to a base station for re-transmission to a number of terminals using beam-forming, in accordance with one embodiment of the invention, given by way of example.
Figure 6:
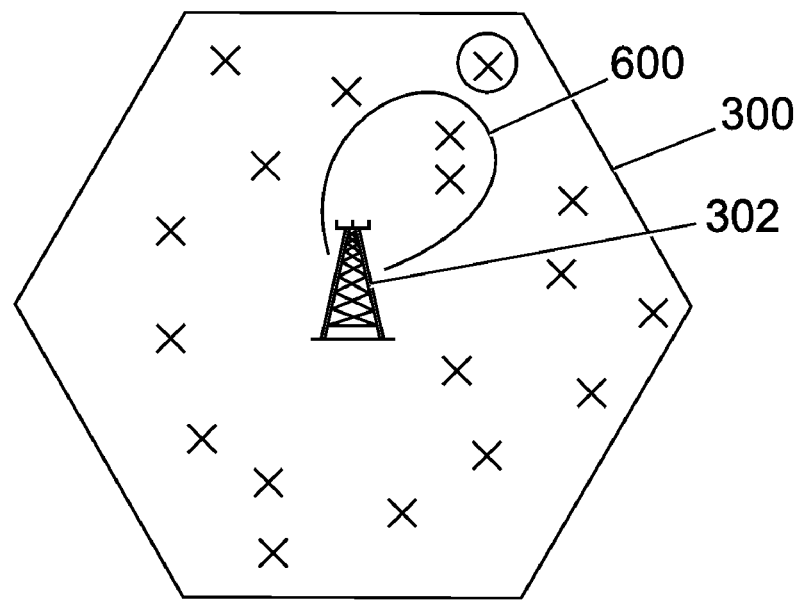
FIG. 6 is a diagram demonstrating terminals in a cell relative to a base station for re-transmission to a single terminal using beam-forming, in accordance with one embodiment of the invention, given by way of example.
Figure 7:
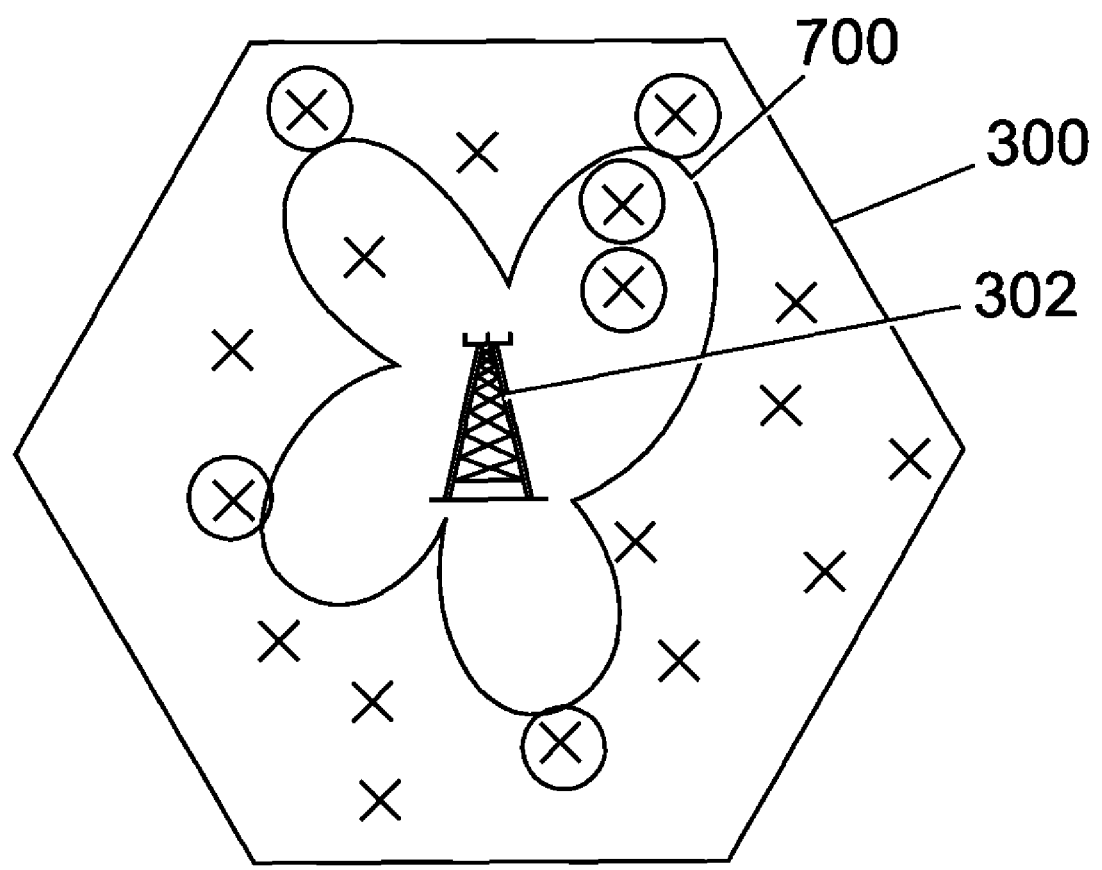
FIG. 7 is a diagram demonstrating terminals in a cell relative to a base station for re-transmission by beam-forming for many terminals, in accordance with one embodiment of the invention, given by way of example.

One technique that may be used for the transmission or re-transmission is beam-forming. A beam is to be understood to be an antenna pattern formed by a multiple antenna array. Depending on the antenna characteristics and/or the beam-forming technique, such a pattern can be very directional and sharp or more diffuse but still have a determined directivity. FIGS. 5-7 illustrate examples of antenna patterns having 1 or 4 beams formed by a beam-forming technique, although other numbers of beams may be formed. A beam can be formed by one or more of the multiple antennas. A multi-antenna formed beam, i.e. a beam that is formed by one or more antennas of an antenna system comprising multiple antennas, is typically created for the re-transmission. However, an already existing multi-antenna formed beam may be used for the transmission or re-transmission, alternatively or in addition.

Beam-forming techniques include switched antennas, adaptive antennas, and other pre-coding based solutions. For beam-forming using a phased array of antennas the base station calculates and applies the required antenna phases and amplitudes to shape the desired antenna pattern with gain maxima towards a required transmission direction. For example, the required transmission direction may be the direction of the terminals which did not receive all of the message in a first transmission and are sent a re-transmission using beam-forming techniques. In the case of switched antennas, the base station will need to select antennas with the highest gain in the direction of the terminals requiring the message to be re-transmitted. In the case of closed loop beam-forming methods, the terminal can measure parameters (e.g. beam-forming weight) of the transmission and report them to the base station that can then be taken into account for the determination of a beam-forming. Closed-loop beam-forming can be for example used in FDD systems. For a time division duplexing (TDD) system, the beam-forming weight may be measured based on an uplink transmission.

Beam-forming calculations can be based on a number of different measurements. For example, measurement in the base station of an uplink signal from the terminal for which the formed beam should be adapted. This may be accomplished by the base station using the NACK transmission to estimate the direction of the terminal from the base station by any appropriate technique.

Alternatively, measurements in the terminal of a downlink signal from the base station may be reported back to the base station to define the requirements of the desired beam pattern. A terminal can use an appropriate approach to measure the radio channel between one or more antennas and at least one of the base station antennas. This could be based on pilot or reference signals transmitted by the base station. Each terminal may perform such measurements, create a report and transmit the report to the base station indicating the antenna beam desired by the terminal. The terminal may transmit the report to the base station in the same transmission that contains the NACK, or in any other appropriate transmission. The base station may instruct the terminals at what point to start reporting the required phases or preferred weight of subsequent transmissions. This has the advantage that it is not necessary to wait for the first NACK message to be generated by a terminal in order to identify that particular transport blocks have not been received correctly by the terminal. Alternatively, the base station may instruct terminals to start reporting only after receipt of the first NACK message. This can ameliorate the number of unnecessary measurements of the downlink signal and the report generation for beam-forming information to the base station. For example the base station may transmit a "start reporting" command only when it has determined that it is necessary to switch to beam-forming as will be described in greater detail below. After receipt of the "start reporting" command, all terminals that have to send a NACK message for a particular transport block, will then report required or relevant phases together with the NACK message until they receive the transport block correctly.

The "start reporting" command may also be transmitted together with each re-transmission to some or all of the terminals, in order to achieve redundancy for the case where a terminal has not received the command. In one embodiment, the scheme adopted is that the "start reporting" command is sent as long as there are NACK reports from terminals that do not include the required beam-forming information.

In one embodiment of the invention the terminal ID may form part of the NACK signal or message, either in an explicit or implicit manner. This may be achieved by using a certain spreading code. If this is the case and an ID is used, the base station may use already existing channel information related to the particular user equipment or terminal associated with that ID. For example, this could make use of regular channel quality indicator reports (the CQI reports) sent for other purposes. Alternatively, feedback information from previous transmission cycles may also be used since the direction of the terminal generally changes very slowly. To generalize this example:

In the case where the phase measurements for beam-forming are performed by the base station, the better measurement accuracy is usually achieved the higher the energy of the received signal from the terminal. Accordingly, a phase measurement based on, for example, a signal containing a CQI report may be more accurate than a measurement based on a signal containing only a NACK message, because the CQI report needs more bits and therefore more signal energy than a NACK message.

Throughout the specification the following nomenclature is adopted, wherein N denotes a maximum number of multi-antenna formed beams, n a number of terminals to which the original transmission (e.g. multicast message) is sent, Z denotes a number of received messages indicating a failed transmission, M denotes a number of terminals that desire or indicate a need for re-transmission, x, y, z denote spatial coordinates, and Amax a threshold value of maximum re-transmissions.

Typically for each failed transmission of data (e.g. failed multicast message) the terminal sends one message to indicate the failed transmission (e.g. a NACK). However, in order to decrease the error probability of the messages indicating the failed transmission, and to improve the accuracy in the determination of the number of the at least one terminal, a terminal may send multiple messages indicating the failed data transmission. A message for indicating the failed data transmission is typically a feedback message e.g. a NACK.

In other words, typically M equals Z, however this may vary. As said before, typically each terminal sends one NACK per failed transmission but there is also the possibility that more than one NACK per terminal and failed transmission can be sent. In this case, the base station may be adapted to determine from each NACK to which terminal and which failed transmission the NACK belongs to conclude from the received NACKs to the real amount of terminals per failed transmission (e.g. an identifier may be associated with each terminal and a further identifier with each transmission and the NACK contains both identifiers), i.e. the base station is adapted to determine whether the Z received messages relate to M terminals. In the following, for the sake of simplicity and illustration, the number of terminals M desiring or indicating a need for re-transmission and the number of received messages Z indicating a failed transmission are identical unless explicitly stated.

The multiple antennas may be able to create only a maximum number (N) of multi-antenna formed beams for re-transmission. Thus, if Z>N messages indicating a failed transmission are received (where Z=M is the number of terminals that did not receive the original data assuming each terminal of the M terminals sends one NACK per failed transmission), the switching-to-beam-forming criterion may not be matched. However, by analyzing the spatial distribution of the M terminals from which the one or more messages were received, it may be possible to determine that more than one terminal is located within the coverage area of the multi-antenna formed beam. Thus more than N terminals can be served with that re-transmission of the data by the N multi-antenna formed beams. Hence, the matching condition of the switching-to-beam-forming criterion is shifted to a higher number (in other words even if M>N beam-forming can be selected) as spatial distribution of the terminals is an appropriate consideration. Hence, a spatial distribution of the least one terminal can be determined for an adaptation of the switching-to-beam-forming criterion.

A spatial distribution of a terminal may give rise to an x, y, z coordinate (or other coordinates) for indicating the location or position. However, the spatial distribution of the terminal can be related to the direction of one or more multi-antenna formed beam or beams that can be created by the multiple antennas. To receive a re-transmission a terminal must be spatially distributed within the coverage area of a beam created by one or more of the multiple antennas. A notation for the spatial distribution may be relative to an axis relating to the multi-antenna formed beam pattern. A direction relating to the multiple antennas (e.g. azimuth possible elevation angle) may be an example of a notation for the spatial distribution of the terminal. It may further be possible to align the spatial distribution to potentially creatable multiple antenna beams for use for the at least one terminal.

In addition, a message indicating a failed transmission (e.g. a NACK message) may be used to determine the spatial distribution of a particular terminal. Furthermore, the energy associated with the message indicating a failed transmission may provide additional information to enable a more accurate measurement to be made. Extended messages indicating a failed transmission may be used to increase the energy from more accurate measurements for the determination of the spatial distribution. An appropriate station may perform such measurements. In addition the station may instruct the multiple terminals to send extended messages indicating a failed transmission (e.g. prolonged NACKs or NACKs with ID or other additional parameters) when the switching-to-beam-forming criteria is likely to be matched, or is matched. In other words, accuracy can be proactively enhanced when switching-to-beam-forming is likely, or has already happened for a previous transmission. This may further enable the sending of multiple messages for indicating the failed transmission are handled more accurately and efficiently.

Instructions (e.g. for the report of a prolonged NACK or the like) may be sent by means of out-of-band signalling (OOBS). OOBS is signalling that is sent separately from the data (e.g. the multicast message) that is sent to the multiple terminals. This is important in ensuring that the instructions are received, although the data may fail to at least one of the terminals.

Figure 2:
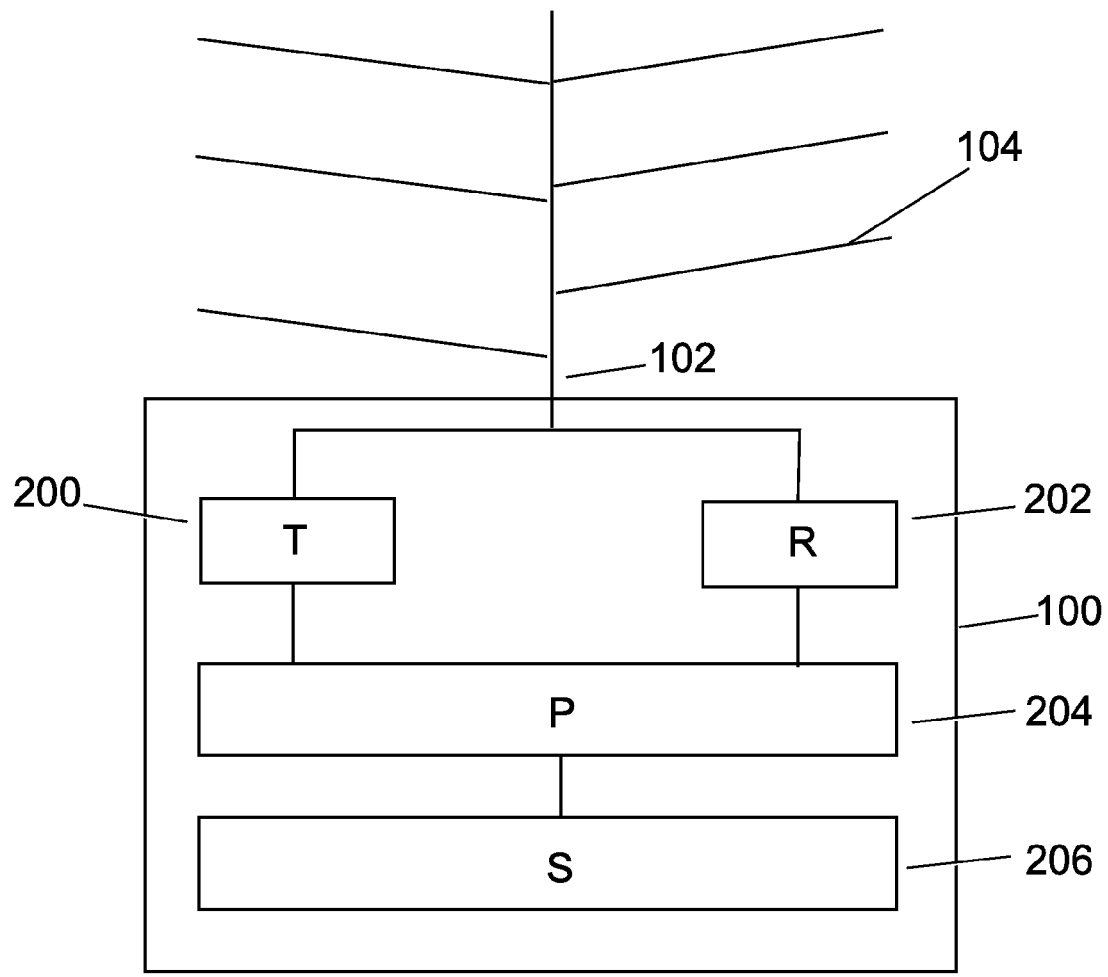
FIG. 2 is a diagram of a base station in accordance with one embodiment of the invention, given by way of example.

FIG. 2 is a simplified diagram of the base station 100 including antenna system 102 having multiple antennas 104. The base station includes hardware and/or software modules adapted to carry out the base station processes in accordance with the present invention. These will be evident from the examples and description below and the general description above. In particular, the base station includes one or more transmission units 200 for transmitting data and one or more receiving units 202 for receiving data. The base station may also include one or more processing units 204 for effecting the processing necessary for the invention and the general operation of a base station. Applications and instructions for each of the functions carried out at the base station may be stored at one or more storage units 206.

Figure 3:
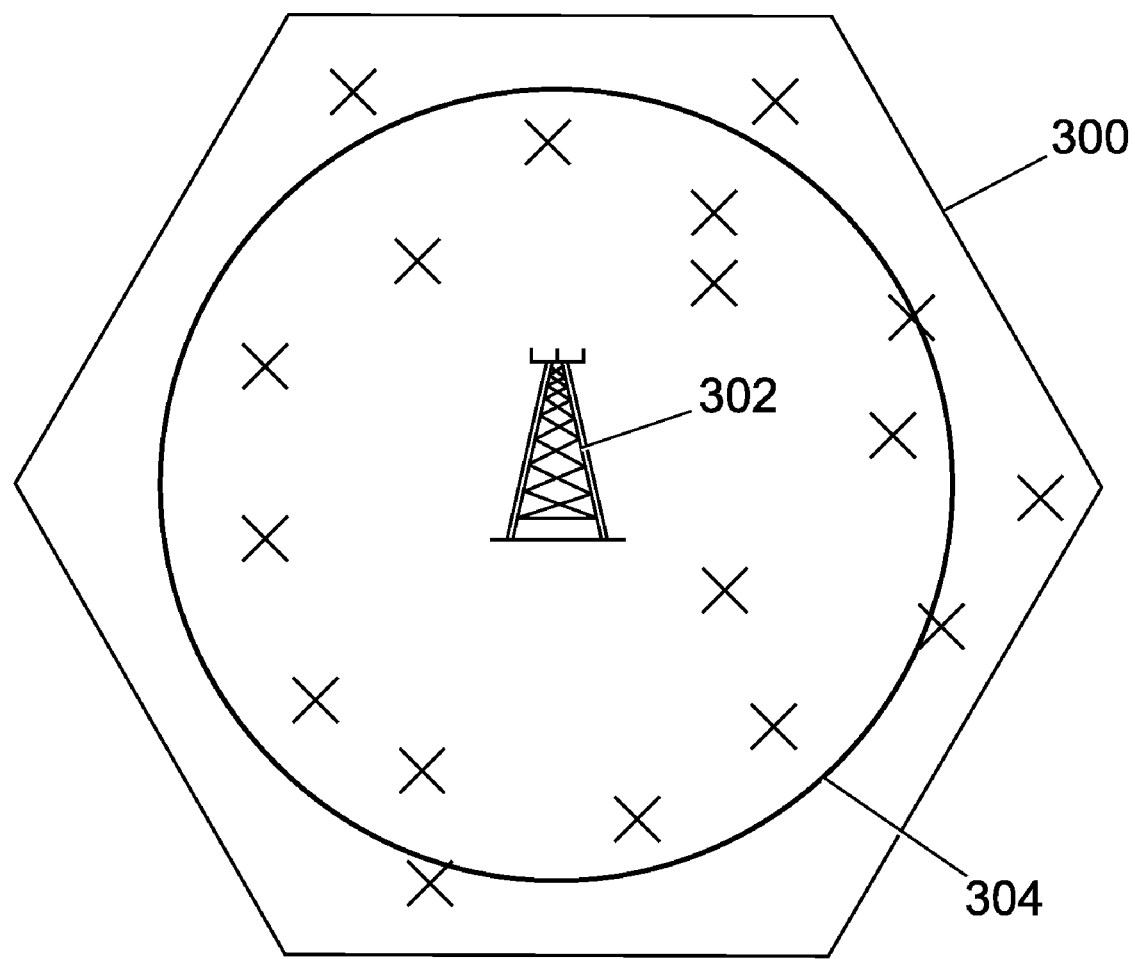
FIG. 3 is a diagram demonstrating terminals in a cell relative to a base station for omni-directional transmission to all terminals, in accordance with one embodiment of the invention, given by way of example.

Referring now to FIG. 3, an example is shown. This example shows a schematic cell layout where a plurality of mobile terminals (shown by crosses) is arbitrarily distributed over a hexagonal coverage area 300. A base station 302 generates an omni-directional antenna pattern shown by circle 304. The circle does not indicate the coverage area of the antenna but instead indicates the antenna pattern. The terminals represented by crosses outside the circle are served by the base station as well as those within the circle. For the first transmission (e.g. a multicast) of new data an omni-directional antenna pattern, such as that shown, is used to cover the complete cell area.

Any terminals that do not receive the multicast transmission correctly will respond with a negative acknowledgement message in line with HARQ feedback. For a multicast typically only a negative acknowledgement message is sent, although this is not always the case.

Figure 4:
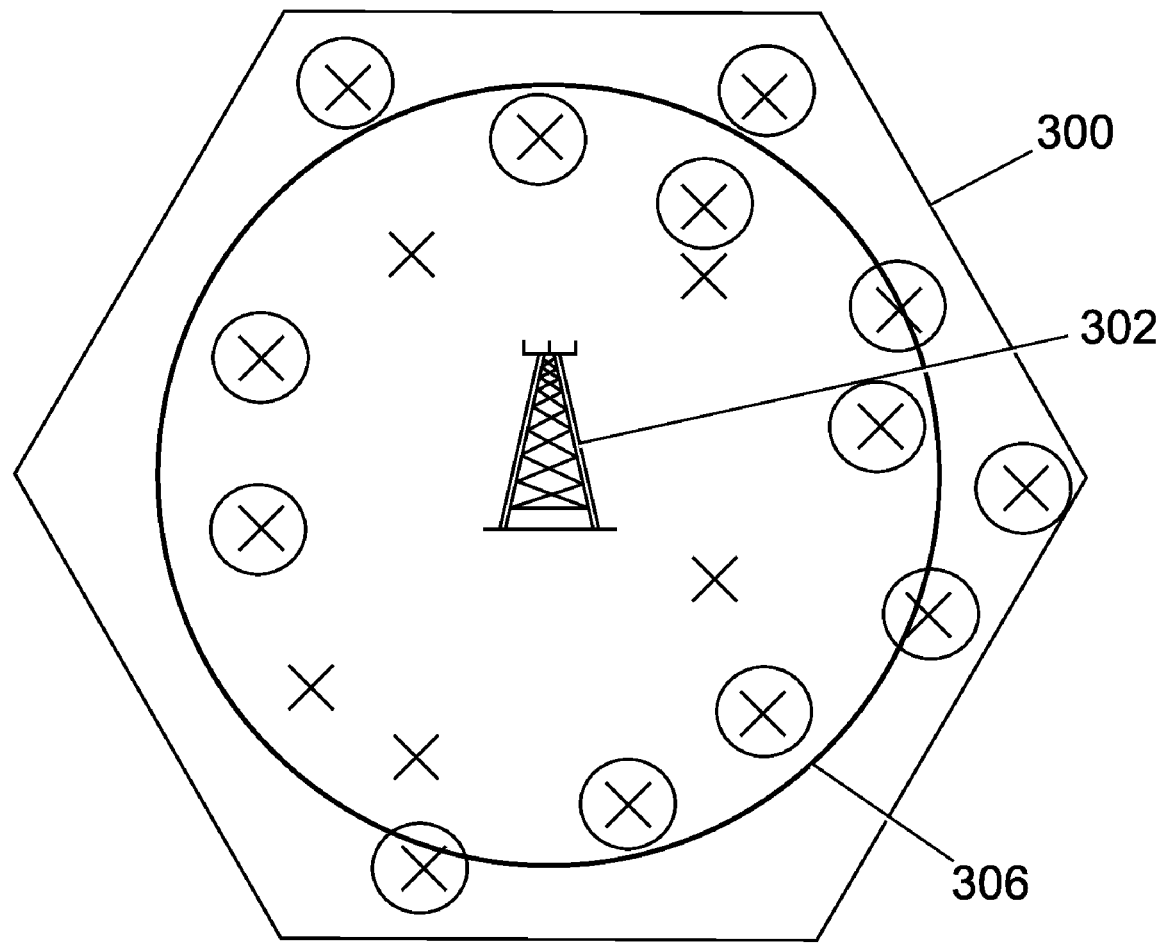
FIG. 4 is a diagram demonstrating terminals in a cell relative to a base station for omni-directional re-transmission to some terminals, in accordance with one embodiment of the invention, given by way of example.

Referring now to FIG. 4, an omni-directional pattern for HARQ re-transmission is illustrated. The terminals (indicated by crosses) include a number of terminals that did not receive the data correctly, as illustrated in FIG. 4. The terminals that did not receive the data correctly are indicated by the crosses in circles in FIG. 4; these terminals require a re-transmission. In this case an omni-directional pattern 306 is generated by base station 302 to attempt to reach all the terminals (indicated by the crosses in circles). The reason that an omni-directional pattern is chosen is that there is still a substantial number of terminals which have not received the message or certain transport blocks in the original multicast.

However, once a certain threshold has been passed it is possible to use beam-forming to reach the terminals that require another HARQ re-transmission. This is shown in FIG. 5. In FIG. 5 four beams 500, 502, 504 and 506 are formed to serve the four terminals that still require a further HARQ re-transmission. Again, the terminals that need further re-transmission are shown as crosses in circles and, as is seen in the diagram, are in the general direction of each of the respective beams 500, 502, 504, and 506.

Similarly, as shown in FIG. 6, only a single terminal (shown as a cross in a circle) requires a further re-transmission. Accordingly, a single beam 600 is generated by the base station 302 and re-transmitted to provide the transport blocks to the single terminal. The re-transmission beam 600 is in the general direction of the single terminal. The beam 600 may be formed by one or more of the multiple antenna elements of the base station 302.

In the examples shown above the number of beams formed is equal to the number of terminals that require a re-transmission. In other words, each terminal receives a re-transmission from a single beam. However, this 1:1 relationship between beams and terminals need not always be the case.

Referring to FIG. 7 a base station 302 is transmitting a multicast message in cell area 300. The base station uses an adaptive threshold to switch to beam-forming based on the direction of the terminals. For example, if terminals that require a re-transmission are all located in a similar direction it is possible to use beam-forming even if there are more terminals than antennas. In FIG. 7, there are six terminals that require a re-transmission (M=6, marked with crosses in circles) which can be served with a beam-formed pattern 700 consisting of four beams.

Generally, the number of beams N that can be formed depends on the antenna, e.g. the number of antenna elements. In other words, an antenna array having N antenna elements can form up to N beams. FIG. 7 illustrates that more than N terminals can be served by an antenna having N elements if at least one of the N beams covers more than one terminal.

For forming a single beam one or more antennas or antenna elements can be used. Using multiple antennas for beam-forming can be of advantage if the energy of the beam, the sharpness and/or directiveness of beam needs to be increased to re-transmit to terminals at the edge of a cell or to minimize interference of re-transmissions with other transmissions within a cell.

Hence, the number and location of the terminals requiring re-transmission and the number and directivity of the beams of the antenna for the re-transmission can be preferably balanced when determining if the switching-to-beam-criterion is matched, and for the selection of the appropriate beam-forming technique.

In other words, in the base station a decision criterion is used to determine when and if to switch to beam-forming. This can be based on the number and spatial distribution of the terminals that have sent a NACK message or communicated that they require re-transmission in another way. Alternatively or additionally, a quality criterion may be analysed as part of the decision-making process. The quality criterion may be used to decide whether a beam-forming technique is preferred over a non-beam-forming technique. For example, an analysis may be made to determine whether the probability of a successful re-transmission is higher using a beam-forming technique or a non-beam-forming technique to the terminals that require re-transmission.

Hence, the switching-to-beam-forming criterion can preferably comprises a quality criterion for deciding whether the beam-forming technique is preferred over a non-beam-forming technique for the re-transmission. This has the advantage that the base station (or more generally, the station) may check the transmission probability of various transmission techniques and may select beam-forming if it has the highest transmission probability. If the multiple antennas are capable of multiple beam-forming techniques, alternatively or in addition, the quality criterion may be used to determine a preferred beam-forming technique out of the multiple beam-forming techniques as the beam-forming technique used for that re-transmission. A combination of techniques may also be used. Alternatively or additionally, it may be determined to re-transmit using a first transmission technique to a first subset of the at least one terminal, and to re-transmit with a second transmission technique to a second subset of the at least one terminal. At least one of the first and second transmission techniques may be a beam-forming technique (if the first and second transmission techniques are both beam-forming techniques they may be different beam-forming techniques as for each subset a different beam-forming technique may be preferred over another).

The decision-making criteria may include the following examples. If the base station has the channel state information between the base station antenna and each of the terminals that are sending a NACK message, this could be used by the base station to estimate, for example, the signal-to-noise ratio (SNR) for each terminal for the next transmission or re-transmission. The signal-to-noise ratio or equivalent transmission quality related parameters may be determined for both beam-forming and non-beam-forming techniques. This information can then be used to determine which technique would be preferable for any re-transmission of a multicast message to the terminals that require re-transmission. The channel state information may be determined from signal measurements in the NACK message or may be measured by the NACK sending terminals and reported to the base station. This can be represented mathematically. If the signal-to-noise ratio for a non-beam-forming technique based on a NACK sending terminal (i, with i=1 to M) is referred to as SNRnonbeam$_i$ and that for a beam-forming technique is called SNRbeam$_i$, then the base station would select beam-forming for the re-transmission if, for example, the following condition is met:

$$\min(SNR\text{beam}_i) > SNR\text{nonbeam}_i$$

where the minimum is determined over all NACK sending terminals i=1 to M.

Otherwise the non-beam-forming technique would be used for the re-transmission.

The decision-making criteria (switching-to-beam-forming criterion) may include a combination of individual criteria, such as quality and spatial distribution of the terminal which require re-transmission, for example. The switching-to-beam-forming criterion may be different for different re-transmissions. For example, if more than one re-transmission is required in a given situation the first re-transmission may not satisfy the switch to beam-forming criterion whilst perhaps the second will satisfy the switching-to-beam-forming criterion. Similarly, for one re-transmission one type of beam-forming may be used, and for another re-transmission another type of beam-forming. For each application and example a different determination may need to be satisfied in order for the switching-to-beam-forming criterion to be achieved. Examples of the factors which may impact switch-to-beam-forming criteria include: the type of base station, the type and number of antennas at the base station, the spatial distribution of terminals which require re-transmission, the manner in which the requirement for re-transmission is indicated, the terminal type and number thereof, and any other appropriate factor.

It will be appreciated that different beam-forming techniques may be used for different re-transmissions, and that for each re-transmission the determinations described herein are made and the decision as to whether to switch to beam-forming takes place based on the relevant criterion for each re-transmission and the circumstances associated therewith. For each beam-forming technique a different combination of beams or beam patterns can be created. The beam pattern is created in a known way by adjustment of azimuth or elevation, for example—or more generally—phase and amplitude of the transmit signal of the or each antenna, and/or by switching between antennas each having a different beam pattern or direction.

Figure 8:
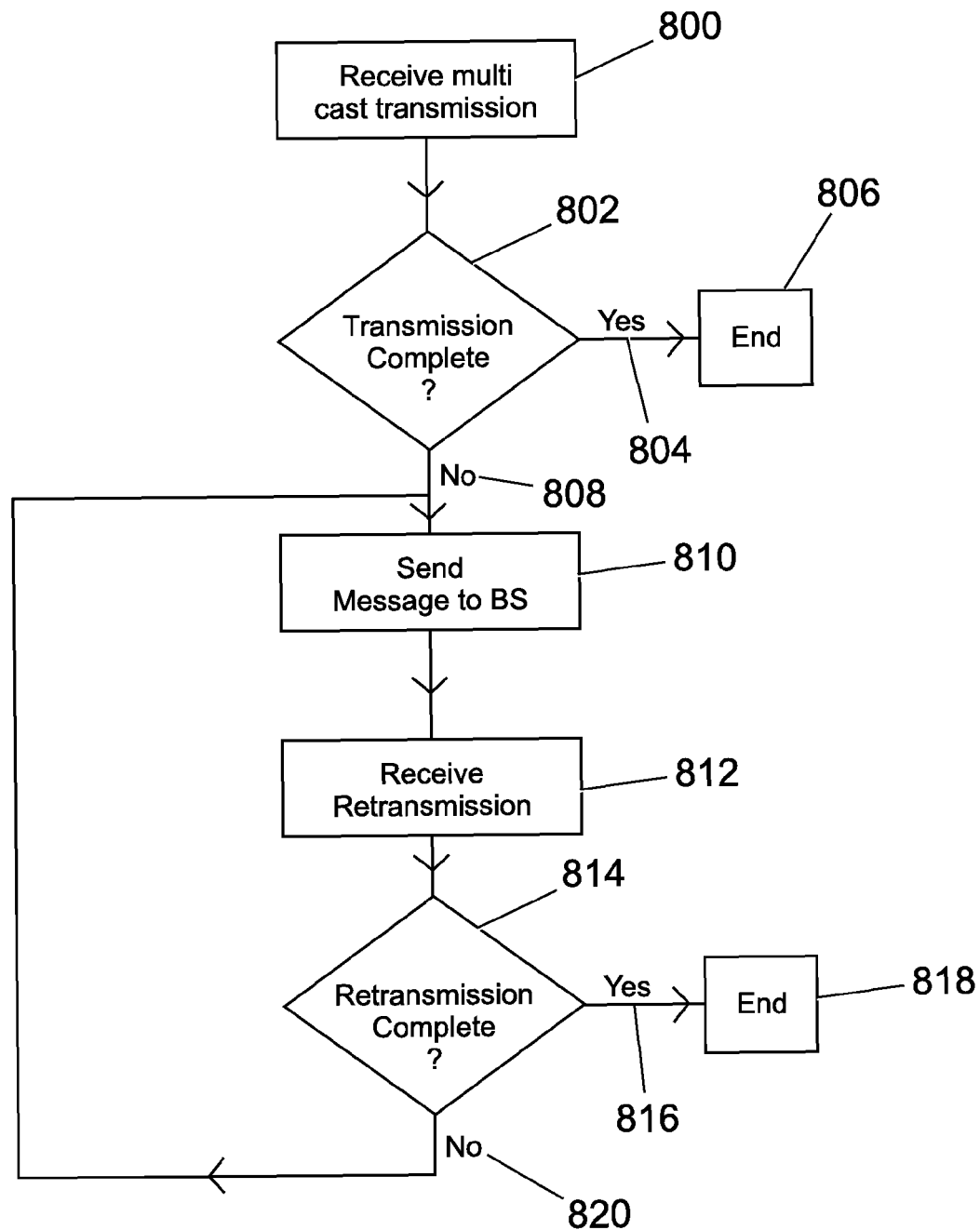
FIG. 8 is a flow chart for identifying the method steps at a terminal, in accordance with one embodiment of the invention, given by way of example.

Referring now to FIG. 8 a flow chart of the method steps at the or each terminal will now be described. The terminal receives a multicast transmission 800. A determination is made as to whether or not the transmission has failed 802. If the terminal has received all transport blocks associated with the transmission (yes: 804) the process at the terminal will end 806. However, if the terminal has not received all the transport blocks associated with the transmission (no: 808) the terminal sends a message to the base station according to step 810. A checksum may be analyzed by the or each terminal as a verification method for determining if reception of the transport blocks has failed or not. The message may be in the form of a NACK message or any other appropriate communication. The message is received at the base station and processed, as will be described in detail with respect to e.g. FIGS. 9 and 10, and a re-transmission is generated. The re-transmission is received by the terminal according to step 812. Determination is made as to whether or not the re-transmission is complete 814. If the re-transmission is complete (yes: 816) the process will end 818. However, if the re-transmission is not complete (no: 820) the process returns to step 810 where a message is sent to the base station. The process may optionally include a process for measuring the maximum number of times a message can be sent to the base station or some other process (perhaps governed by the base station) to ultimately end the process after a predetermined number of tries. The message which is generated to give rise to the or each re-transmission may be of any appropriate type.

Figure 9:
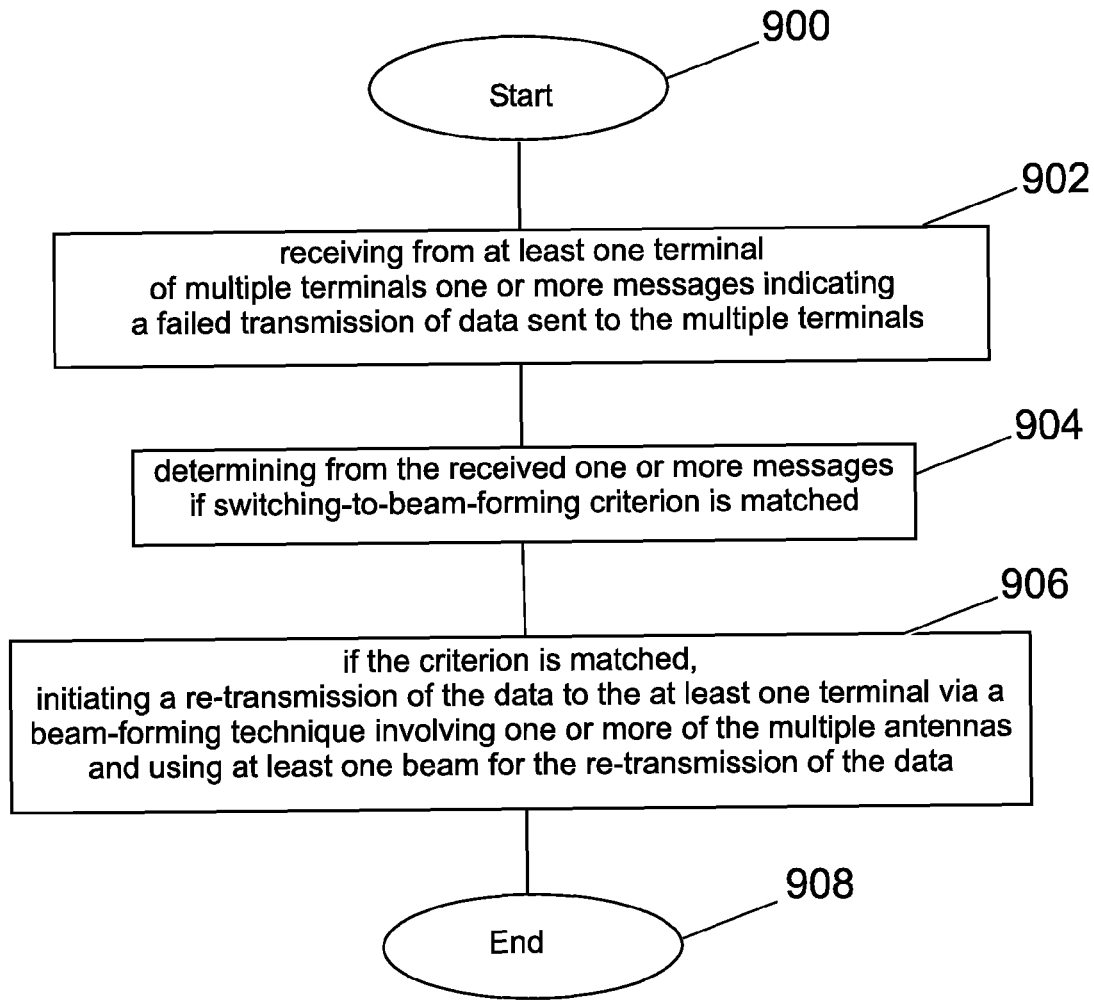
FIG. 9 is a flow chart for identifying the method steps at a base station, in accordance with one embodiment of the invention, given by way of example.

Referring to FIG. 9, a flowchart of an embodiment of the method steps at the base station will now be described. The process starts at step 900 with the transmission of data to multiple terminals within the coverage of the base station. At step 902 the base station receives one or more messages from at least one terminal of the multiple terminals indicating a failed transmission of the data sent to the multiple terminals in step 900. At step 904 the base station determines if a switching-to-beam-forming criterion is matched based on the received one or more messages. At step 906 the base station determines that if the criterion is matched, re-transmission of the data to the at least one terminal takes place by means of a beam-forming technique involving one or more multiple antennas. The re-transmission of data is effected by means of a least one beam. The process ends at step 908.

Figure 10:
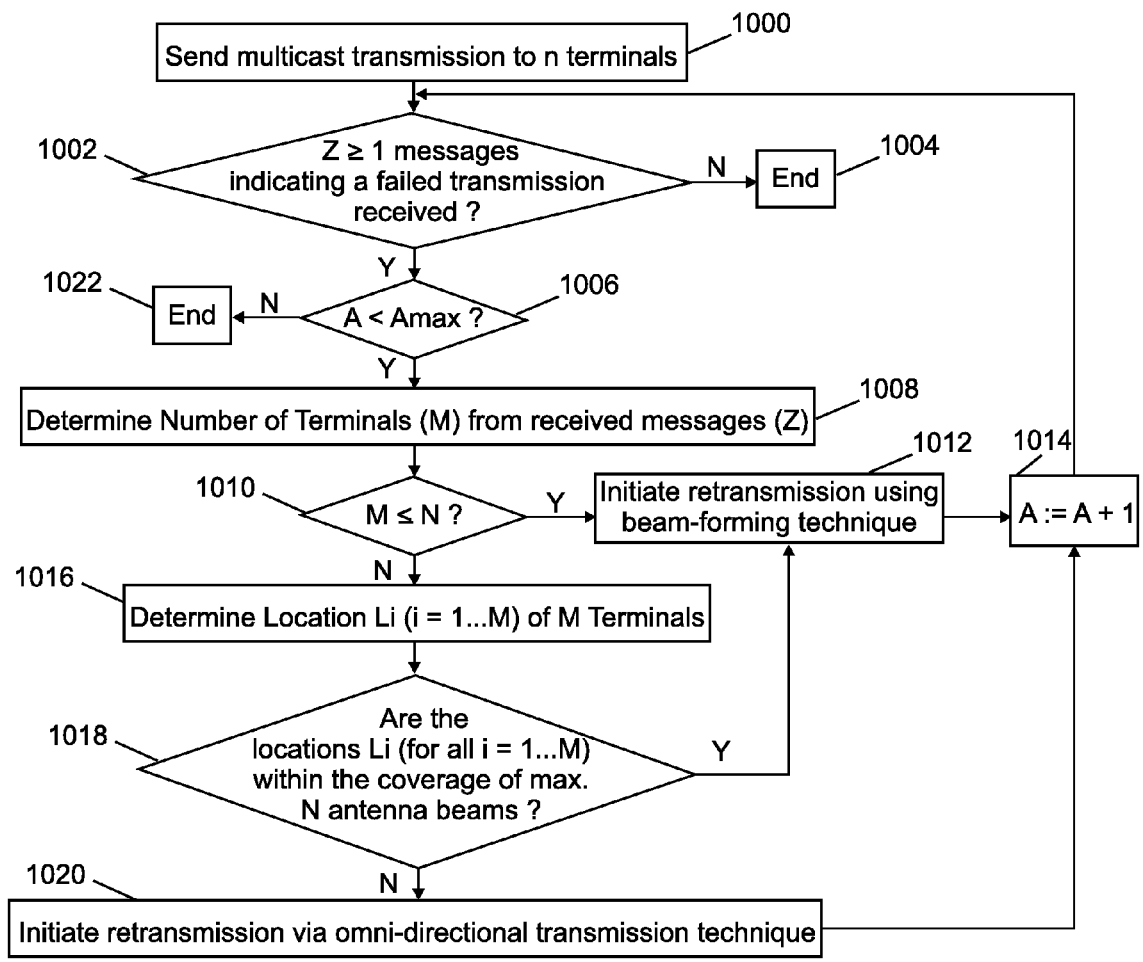
FIG. 10 is a flow chart for identifying the method steps at a base station, in accordance with one embodiment of the invention, given by way of example.

Referring now to FIG. 10, showing a flowchart of method steps according to an embodiment of the invention performed at a station. For illustrative purpose, FIG. 10 is described in terms of a base station.

At step 1000 a base station sends a multicast transmission to n terminals. The terminals are adapted to receive a multicast transmission in accordance with the details described above with reference to FIG. 9. Any terminal which does not receive the full transport blocks of the particular multicast transmission will send one or more messages (for example a NACK message) indicating that not all data was received from the multicast transmission.

At the base station a determination 1002 is made whether $Z \geq 1$ NACK messages are received. If no such messages are received, i.e. Z equals zero, the base station will not perform any re-transmission as indicated by step 1004.

If the condition $Z \geq 1$ is fulfilled (Y), then a value A of a re-transmission counter is obtained and compared to a value Amax indicating a threshold value of maximum re-transmissions as indicated by 1006. As at this stage no re-transmissions were initiated, A is below Amax (usually A equals 0 at this stage) and the method proceeds. At step 1008 the number of terminals M is determined from the Z received messages. As explained already above in detail, M equals Z if each terminal sends only one NACK message. Hence this step may be omitted if the transmission system is configured to only transmit one NACK message per terminal to indicate a failed transmission.

According to step 1010, the base station then compares the number M of terminals from which messages indicating a failed transmission were received with the maximum number N of multi-antenna formed beams of the base station.

If the number of terminals M is below or equal to the maximum number of possible beams N (Y), then a re-transmission using a beam-forming technique is initiated according to step 1012.

If the number of terminals M is above to the maximum number of possible beams N (N), then the location Li of each terminal i of the M terminals can be determined 1016. It is analyzed whether a transmission is possible using at most N beams so that the locations Li for all i from 1 to M are within the coverage areas of the beams. If this is the case (Y), the M>N terminals can be served by N antenna beams and a re-transmission using a beam-forming technique can be initiated according to step 1012. If the result of the analysis of step 1018 would be negative (N), the base station cannot serve all M terminals with N antenna beams at the same time. Instead, it may proceed to initiate a re-transmission via an omni-directional transmission as illustrated by step 1020. As an alternative to step 1020 (not depicted in FIG. 10), the base station may initiate a re-transmission via a sequential beam-forming technique wherein the base station performs the re-transmission to a first subset of the M terminals via a first arrangement of possible antenna beams and at a later point in time to a second sub-set of the M terminals via a second arrangement of possible antenna beams. A sequential beam-forming technique for the re-transmission may be preferred for non-time critical transmissions where the delay introduced by the sequential re-transmission is tolerable.

After a re-transmission was initiated 1012, 1020, the value of A is increased (step 1014) and the method proceeds to step 1002. In any iteration of the method subsequent to the first re-transmission, Z denotes a number of received messages indicating a failed re-transmission. Assuming that a previous re-transmission was at least partly successful, M can be expected to be substantially lower in any subsequent iteration.

Irrespective of the re-transmission technique that is chosen at a certain point in time, either no further messages are received at the base station (i.e. Z=0) or the maximum number of re-transmissions is reached (i.e. $A \geq Amax$). At this point in time the process will end according to steps 1004 and 1022, respectively.

Initiation 1012, 1020 of a re-transmission using a beam-forming technique may comprise the step of selecting an appropriate beam-forming technique from multiple possible beam-forming technique as already described above in more detail. The locations Li of the M terminals are preferably considered for the selection and initiation and therefore the step 1016 may be performed at an earlier stage, as depicted in FIG. 10, e.g. in conjunction with step 1008. However, the determination of locations may be omitted for those terminals which are known by the base station to be immobile, i.e. have a fixed location.

The step 1002 is an example of a possible implementation of step 902 in FIG. 9. Steps 1008, 1010, and 1012 and steps 1016, 1018, and 1012 are examples of possible implementation(s) of steps 904 and 906 in FIG. 9.

It will be appreciated that the order of the steps shown in the flowcharts of FIGS. 8, 9 and 10 need not be limited to the examples shown, but may in fact be carried out in a different order. Similarly any other orders implied with respect to other figures may also occur in a different manner.

In accordance with the present invention the examples illustrate a wireless communication between the base station and the terminals by means of wireless connections.

In the following, a station for optimizing re-transmission in a multi-antenna multi-terminal network is described in more detail. The station may be a base station or may comprise a base station or may be comprised in a base station or connected to a base station. For illustrative purposes, the station is described using the terminology and elements of FIG. 2, however, it is evident that the following sections apply to a station and are not restricted to a base station.

The base station 100 comprises a receiving unit 202 for receiving data (e.g. in form of messages), a transmission unit 200 for sending data (e.g. in form of messages), and a processing unit 204 for processing of data (e.g. in form of messages or other format for information). Data sent to the multiple terminals may be a message such as a multicast or broadcast message. The base station 100 as depicted further comprises a storage unit 206 for storing and/or retrieving data and one or more antennas 104 of an antenna system 102. The transmission unit 200 may comprise elements for activating and/or feeding individual antennas 104 of the antenna system 102 to form one or more beams via a beam-forming technique as controlled by the processing unit 204.

The receiving unit 202 is adapted to receive from at least one terminal of multiple terminals one or more messages indicating a failed transmission of data sent to the multiple terminals. The processing unit 204 is adapted to determine from the received one or more messages if a switching-to-beam-forming criterion is matched, and if the criterion is matched, to initiate a re-transmission of the data to the at least one terminal via the transmission unit 200 and the antenna system 102 via a beam-forming technique involving one or more of the multiple antennas 104 and using at least one beam for the re-transmission of the data.

The processing unit 204 may be further adapted to determine a number of the at least one terminals from the received one or more messages for determining if the switching-to-beam-forming criterion is matched. According to a preferred embodiment, the switching-to-beam-forming criterion comprises a quality criterion for deciding by the processing unit 204 whether the beam-forming technique is preferred over a non-beam-forming technique for the re-transmission.

According to another preferred embodiment, the processing unit 204 may be adapted to determine a spatial distribution of the at least one terminal for an adaptation of the switching-to-beam-forming criterion. The switching-to-beam-forming criterion may comprise a threshold value. In addition, the switching-to-beam-forming criterion may be matched if the number of the at least one terminal equals and/or falls below the threshold value.

According to another preferred embodiment, the beam-forming technique comprises at least one of switched antennas and phased array antennas techniques.

According to another preferred embodiment, the processing unit 204 may be adapted to determine the spatial distribution based on a measurement of the received one or more messages which indicate a failed transmission. The processing unit 204 may be further adapted to determine the spatial distribution from at least one report received from the at least one terminal. Each report may comprise information indicative of a desired beam direction.

According to another preferred embodiment, the processing unit 204 is adapted to initiate a sending of an instruction to the multiple terminals or a sub-set of the multiple terminals to start sending the at least one report if the switching-to-beam-forming criterion will likely be matched or is matched.

According to another preferred embodiment, the processing unit is 204 adapted to control the antenna system 102 such that the at least one beam is created according to the determined spatial distribution.

The present invention further concerns a computer programme comprising portions of software code in order to implement the method as described herein when operated at a station (for example the base station). The computer program can be stored on a computer readable medium. The computer readable medium can be a permanent or rewritable memory within the station or may be located externally. The computer program can also be transferred to the station, for example via cable or wireless link as a sequence of signals.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the base station, terminals, units or devices, for example via intermediate entities. Accordingly, unless implied or stated otherwise, the connections may, for example, be direct connections or indirect connections. Furthermore, not only the re-transmission but also the transmission may be performed by a beam-forming technique, e.g. the transmission may be sent via a first beam-forming technique and the re-transmission via a second beam-forming technique. Alternatively, the beam-forming technique for the transmission and the re-transmission can be the same but parameters of the beam-forming technique may be different for the transmission and the re-transmission. For example as a result of a matching of a switching-to-beam-forming criterion, different antennas are switched and/or different amplitudes and phases are adjusted when initiating the re-transmission. Hence, matching of a switching-to-beam-forming-criterion may imply switching from a non-beam forming technique to a beam-forming technique, from a first beam-forming technique to a second beam-forming technique, or switching beam within a beam-forming technique.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatus, while functionally operating as a single device.

Also, devices functionally forming separate devices may be integrated in a single physical device.

Similarly, other modifications, variations and alternatives are also possible. The specifications and drawings are, accordingly, to be regarded in an illustrative rather than in a restrictive sense.

The invention claimed is:

1. A method for optimizing re-transmission in a multi-antenna radio base station within a mobile network including a plurality of mobile terminals, comprising the steps of:
   receiving from at least one terminal of multiple terminals one or more messages indicating a failed transmission of data sent to the multiple terminals,
   determining from the received one or more messages if a switching-to-beam-forming criterion is matched, wherein a spatial distribution of the at least one terminal is determined for an adaptation of the switching-to-beam-forming criterion, and
   if the criterion is matched, initiating a re-transmission of the data to the at least one terminal via a beam-forming technique involving one or more of the multiple antennas and using at least one beam for the re-transmission of the data.

2. The method according to claim 1 wherein a number of the at least one terminals is determined from the received one or more messages for determining if the switching-to-beam-forming criterion is matched.

3. The method according to claim 1, wherein the switching-to-beam-forming criterion comprises a quality criterion for deciding whether the beam-forming technique is preferred over a non-beam-forming technique for the retransmission.

4. The method according to claim 1, wherein the switching-to-beam-forming criterion is matched if the number of the at least one terminal equals and/or falls below a threshold value.

5. The method according to claim 1, wherein the beam-forming technique comprises at least one of switched antennas and phased array antennas techniques.

6. The method according to claim 1, wherein the spatial distribution is determined based on a measurement of the received one or more messages which indicate a failed transmission.

7. The method according to claim 1, wherein the spatial distribution is determined from at least one report received from the at least one terminal.

8. The method according to claim 7, wherein each report comprises information indicative of a desired beam direction.

9. The method according to claim 7, wherein the station instructs the multiple terminals or a sub-set of the multiple terminals to start sending the at least one report if the switching-to-beam-forming criterion will likely be matched or is matched.

10. The method according to claim 1, wherein the at least one beam is created according to the determined spatial distribution.

11. A system for optimizing re-transmission in a multi-antenna radio base station within a mobile network including a plurality of mobile terminals, comprising:
   receiving unit for receiving from at least one terminal of multiple terminals one or more messages indicating a failed transmission of data sent to the multiple terminals, processing unit for determining from the received one or more messages if a switching-to-beam-forming criterion is matched, wherein a spatial distribution of the at least one terminal is determined for an adaptation of the switching-to-beam-forming criterion, and if the criterion is matched, transmission unit for initiating a re-transmission of the data to the at least one terminal via a beam-forming technique involving one or more of the multiple antennas and using at least one beam for the re-transmission of the data.

12. The system of claim 11 wherein a number of the at least one terminal is determined from the received one or more messages for determining if the switching-to-beam-forming criterion is matched.

13. The system of claim 11 wherein the switching-to-beam-forming criterion comprises a quality criterion for deciding whether the beam-forming technique is preferred over a non-beam-forming technique for the retransmission.

14. The system of claim 11, wherein the switching-to-beam-forming criterion is matched if the number of the at least one terminal equals and/or falls below a threshold value.

15. The system of claim 11, wherein the beam-forming technique comprises at least one of switched antennas and phased array antennas techniques.

16. The system of claim 11, wherein the spatial distribution is determined based on a measurement of the received one or more messages which indicate a failed transmission.

17. The system of claim 11, wherein the spatial distribution is determined from at least one report received from the at least one terminal.

18. The system of claim 17, wherein each report comprises information indicative of a desired beam direction.

19. The system of claim 17, wherein the station instructs the multiple terminals or a sub-set of the multiple terminals to start sending the at least one report if the switching-to-beam-forming criterion will likely be matched or is matched.

20. The system of claim 11, wherein the at least one beam is created according to the determined spatial distribution.

* * * * *

UNITED STATES PATENT AND TRADEMARK OFFICE
CERTIFICATE OF CORRECTION

PATENT NO. : 8,321,739 B2  
APPLICATION NO. : 12/523789  
DATED : November 27, 2012  
INVENTOR(S) : Huschke et al.

It is certified that error appears in the above-identified patent and that said Letters Patent is hereby corrected as shown below:

In column 2, lines 19-20, delete "This object is solved by the independent………… in the further claims.".

Signed and Sealed this
Second Day of April, 2013

Teresa Stanek Rea
*Acting Director of the United States Patent and Trademark Office*